United States Patent
Zhao

(10) Patent No.: US 9,596,313 B2
(45) Date of Patent: Mar. 14, 2017

(54) METHOD, TERMINAL, CACHE SERVER AND SYSTEM FOR UPDATING WEBPAGE DATA

(71) Applicant: Tencent Technology (Shenzhen) Company Limited, Shenzhen, Guangdong Province (CN)

(72) Inventor: Wei Zhao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 388 days.

(21) Appl. No.: 14/266,393

(22) Filed: Apr. 30, 2014

(65) Prior Publication Data

US 2014/0310372 A1    Oct. 16, 2014

Related U.S. Application Data

(63) Continuation of application No. PCT/CN2013/087871, filed on Nov. 26, 2013.

(30) Foreign Application Priority Data

Apr. 12, 2013 (CN) .......................... 2013 1 0127274

(51) Int. Cl.
  *H04L 12/26* (2006.01)
  *H04L 29/08* (2006.01)
(52) U.S. Cl.
  CPC .......... *H04L 67/2842* (2013.01); *H04L 67/02* (2013.01)
(58) Field of Classification Search
  USPC .................. 709/213, 219, 203, 223, 227
  See application file for complete search history.

(56) References Cited

U.S. PATENT DOCUMENTS

| | | | | |
|---|---|---|---|---|
| 7,028,032 | B1 * | 4/2006 | Diedrich | G06F 17/30884 |
| 7,657,652 | B1 * | 2/2010 | Balaji | G06F 17/30902 |
| | | | | 709/201 |
| 8,103,742 | B1 * | 1/2012 | Green | G06F 17/30893 |
| | | | | 709/218 |

(Continued)

FOREIGN PATENT DOCUMENTS

| | | |
|---|---|---|
| CN | 1783804 A | 6/2006 |
| CN | 101079041 A | 11/2007 |
| CN | 101958799 A | 1/2011 |

OTHER PUBLICATIONS

First Office Action dated Apr. 28, 2016 for Chinese Patent Application No. CN201310127274 .2 filed on Apr. 12, 2013, including a concise explanation of relevance.

(Continued)

*Primary Examiner* — Jude Jean Gilles
(74) *Attorney, Agent, or Firm* — Anova Law Group, PLLC

(57) ABSTRACT

A method, terminal, cache server and system for updating webpage data are disclosed. In one aspect, the method includes obtaining an update identifier corresponding to latest released webpage update data, sending a first update request for obtaining the webpage update data to a cache server, wherein the first update request includes the update identifier. The method also includes receiving the webpage update data from the cache server based on the first update request and updating the current webpage data based on the webpage update data.

20 Claims, 6 Drawing Sheets

(56) References Cited

U.S. PATENT DOCUMENTS

| | | | |
|---|---|---|---|
| 2002/0116481 A1* | 8/2002 | Lee | H04L 29/06 |
| | | | 709/220 |
| 2005/0044192 A1* | 2/2005 | Applin | G06F 17/3089 |
| | | | 709/223 |
| 2006/0015763 A1* | 1/2006 | Nakajima | H04L 29/06 |
| | | | 714/4.1 |
| 2010/0063998 A1* | 3/2010 | Nakamura | H04L 67/2842 |
| | | | 709/203 |
| 2011/0060812 A1* | 3/2011 | Middleton | G06F 17/30902 |
| | | | 709/219 |
| 2011/0066704 A1* | 3/2011 | Nakamura | G06F 11/3414 |
| | | | 709/219 |
| 2012/0324336 A1* | 12/2012 | Maeda | H04N 1/00464 |
| | | | 715/234 |
| 2013/0144994 A1* | 6/2013 | Li | G06F 17/30864 |
| | | | 709/220 |
| 2014/0289394 A1* | 9/2014 | Wu | G06F 17/30864 |
| | | | 709/224 |

OTHER PUBLICATIONS

International Search Report dated Mar. 6, 2014 for International Patent Application No. PCT/CN2013/087871 filed on Nov. 26, 2013.

* cited by examiner

METHOD, TERMINAL, CACHE SERVER AND SYSTEM FOR UPDATING WEBPAGE DATA

CROSS REFERENCE TO RELATED APPLICATIONS

This application is a U.S. continuation application under 35 U.S.C. §111(a) claiming priority under 35 U.S.C. §§120 and 365(c) to International Application No. PCT/CN2013/087871 filed on Nov. 26, 2013, which claims the priority benefit of Chinese Patent Application No. 2013101272742 filed on Apr. 12, 2013, the contents of which are incorporated by reference herein in their entirety for all intended purposes.

FIELD OF THE INVENTION

The present invention relates to the field of computer technology, particularly relates to a method, terminal, cache server and system for updating webpage data.

BACKGROUND OF THE INVENTION

With development of the network technology, applications on the terminals can be updated through the network. Each webpage in an application program, for example, the display position of a button in a webpage, has fixed display logic, which is determined upon the development of the application program and cannot be changed. If the display logic needs to be changed, then the application program needs to be redeveloped, that is, the entire application program needs to be updated, causing traffic waste. For example, a browser can be embedded in the application program, and the pages of the application program can be displayed by the embedded browser. Particularly, by obtaining webpage data which includes the webpage display logic and the webpage display elements through the embedded browser, the respective webpage is then obtained according to the webpage data. Because the webpage display logic is edited by a network server and can be changed at any time, the webpage of the application program may be updated by updating the webpage data, so as to avoid updating all data of the application program and significantly increase the operability of the application program.

The standard method for updating webpage data comprises: a developer uploading webpage update data onto a data server, then the data server pre-caching the webpage update data onto a cache server through network, the application program in a terminal capable of at a scheduled time sending an update request which carries an identifier of the webpage update data to the cache server for obtaining the webpage update data, and updating current webpage data according to the webpage update data, the current webpage data being webpage data in the application at current time.

During the implementation of the described technology, the inventor has found at least the following problems in standard method:

In the standard method, if the identifier of the webpage update data is the same as that of the current webpage data, then after the terminal sends the update request which carries the identifier of the webpage update data to the cache server, if what stored in the cache server is still the current webpage data, the cache server will send the current webpage data corresponding to the identifier to the terminal again, causing waste of the broadband resource.

SUMMARY OF THE INVENTION

In order to solve the problem that when the identifier of the webpage update data is the same as that of the current webpage data, the cache server sends the current webpage data as the webpage update data to the terminal again causing waste of the broadband resource, the described technology provides a method, terminal, cache server and system for updating the webpage data. The technical solution is as follows:

In one aspect, embodiments provide a method for updating webpage data for using in a terminal, the method comprising: obtaining an update identifier corresponding to latest released webpage update data, the webpage update data being used to update current webpage data, the current webpage data is webpage data for being displayed by a browser embedded in an application program at current time; sending a first update request for obtaining the webpage update data to a cache server, the first update request carrying the update identifier; receiving the webpage update data fed back by the cache server according to the first update request; and updating the current webpage data according to the webpage update data.

In another aspect, embodiments provide a method for updating webpage data for using in a cache server, the method comprising: receiving a first update request for obtaining webpage update data sent by a terminal, the first update request carries an update identifier obtained by the terminal and corresponding to latest released webpage update data, the webpage update data is used for updating current webpage data, the current webpage data is the webpage data used at current time for being displayed by an embedded browser in an application program; feeding back the webpage update data to the terminal according to the first update request for updating the current webpage data by the terminal.

In yet another aspect, embodiments provide a terminal, the terminal comprising at least a processor operating in conjunction with a memory and a plurality of modules, the plurality of modules comprising: an obtaining module for obtaining an update identifier corresponding to latest released webpage update data, the webpage update data is used to update current webpage data, the current webpage data webpage data for being displayed by a browser embedded in an application program at current time; a sending module for sending a first update request for obtaining the webpage update data to a cache server, the first update request carrying the update identifier obtained by the obtaining module; a first receiving module for receiving the webpage update data fed back by the cache server according to the first update request sent by the sending module; an updating module for updating the current webpage data according to the webpage update data received by the first receiving module.

In a further aspect, embodiments provide a cache server, wherein the cache server comprises at least a processor operating in conjunction with a memory and a plurality of modules, the plurality of modules comprising: a second receiving module for receiving a first update request for obtaining webpage update data sent by a terminal, the first update request carries update identifier received by the terminal and corresponding to latest released webpage update data, the webpage update data is used for updating the current webpage data, the current webpage data is the webpage data used at current time for being displayed by a browser embedded in an application program; a feedback module for feeding back the webpage update data to the terminal according to the first update request received by the second receiving module for updating the current webpage data by the terminal.

In a further aspect, embodiments provide a system for updating webpage data, wherein the system comprises a terminal as describe above and a cache server as described above.

In a further aspect, embodiments provide a computer program product comprising program codes for performing the methods described above according to the described technology when the computer program product is executed on one or more computing devices. Optionally, the computer program product can be stored on a computer readable recording medium.

The technical solution provided by the embodiments brings the following beneficial effects: through obtaining an update identifier corresponding to the latest released webpage update data, sending a first update request for obtaining the webpage update data to the cache server, the first update request carries the update identifier; and receiving the webpage update data fed back by the cache server according to the first update request, it solves the problem that when the identifier of the webpage update data is the same as that of the current webpage data, the cache server sends the current webpage data as the webpage update data to the terminal again causing waste of the broadband resource and achieves an effect of saving the bandwidth resource.

BRIEF DESCRIPTION OF THE DRAWINGS

In order to explain more clearly the technical solution in the embodiments, the figures used for describing the embodiments will be briefly introduced below. It is apparent that the figures described below are only some embodiments of the described technology, and it is possible for a person skilled in the art to obtain other figures according to these figures without paying creative work.

DETAILED DESCRIPTION OF THE PREFERRED EMBODIMENT

In order to make the purposes, technical solutions and advantages of the described technology clearer, the embodiments will be further described in detail by in connection with the accompany figures.

Cache servers may be different network nodes in different network environments. In one case, the cache server may be one CDN (Content Delivery Network) in CDN networks. CDN networks are used for real-time redirecting a request sent by a terminal to one CDN closest to the terminal, according to the comprehensive information of network traffics, connections of each node, loads, distance to the terminal and response time, etc. Because of the high costs of deploying CDN, not all carriers are deployed with CDN. Therefore, in another case, the carriers without CDN deployment also can connect to one CDN in CDN networks through other carriers, and cache the webpage data in the CDN acquired from the other carriers into a cache device. Here, the cache sever may be a cache device located between the terminal and the CDN. In order to reduce the costs of obtaining webpage data in the CDN through other carriers, the cache device may also be set with an update policy, for example, sending a webpage data update request to the CDN every hour.

First Embodiment

Figure 1:
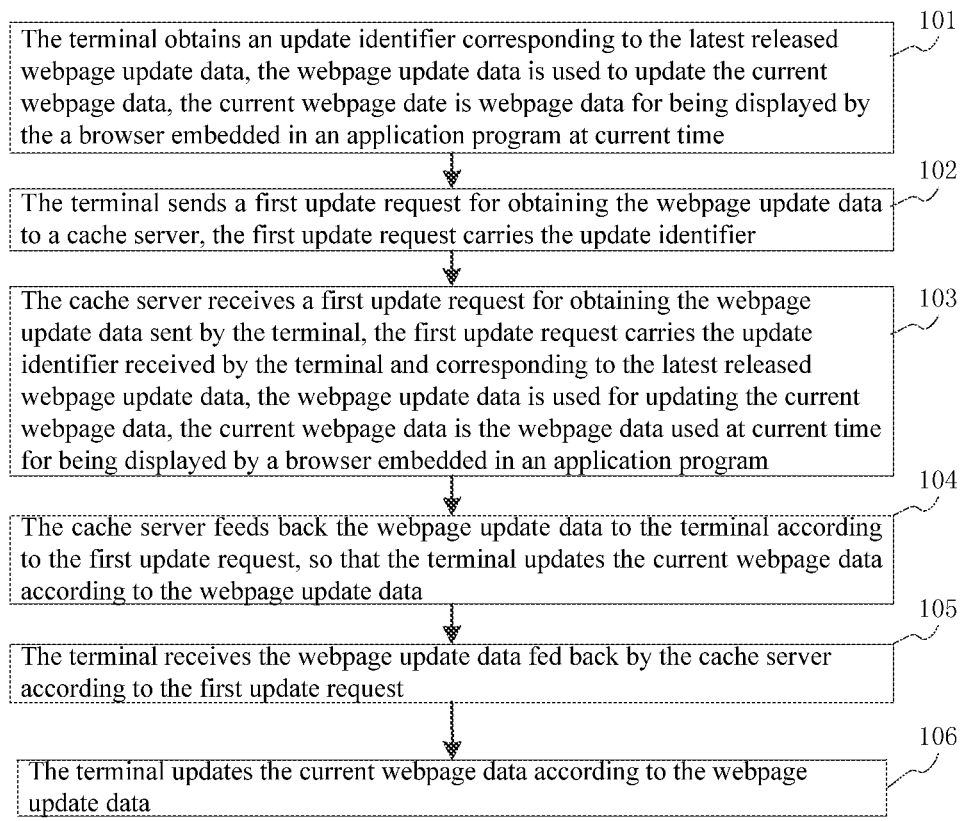
FIG. 1 is a method flowchart of a method for updating webpage data provided by a first embodiment.

Referring to FIG. 1, it shows a method flowchart of a method for updating webpage data provided by a first embodiment, wherein the method for updating webpage data can be applied in a system comprising a terminal and a cache server, the terminal can be a smart TV, smart phone or tablet computer, etc., the cache server can be a CDN or a cache device, etc. The method for updating webpage data comprise:

Step 101, the terminal obtains an update identifier corresponding to latest released webpage update data, the webpage update data being used to update current webpage data, the current webpage data is webpage data for being displayed by a browser embedded in an application program at current time.

Because the webpage data is released immediately after the data server receives the webpage data uploaded by a developer, it may be determined that the latest released webpage data is the webpage update data. Furthermore, in order to distinguish the webpage update data from the current webpage data, an update identifier corresponding to the webpage update data may be pre-set, the update identifier is different from the current webpage data identifier corresponding to the current webpage data.

Step 102, the terminal sends a first update request for obtaining the webpage update data to a cache server, the first update request carries the update identifier.

After the terminal receives the update identifier, if existence of the webpage update data is determined, then the first update request can be sent to a cache server which has pre-cached the webpage update data. In order for the cache server to confirm the webpage update data requested by the terminal, an update identifier corresponding to the webpage update data may be carried in the first update request, so that the cache server feeds back the webpage update data to the terminal according to the update identifier.

Step 103, the cache server receives a first update request for obtaining the webpage update data sent by the terminal, the first update request carries the update identifier received by the terminal and corresponding to the latest released webpage update data, the webpage update data is used for updating the current webpage data, the current webpage data is the webpage data used at current time for being displayed by a browser embedded in an application program.

Step 104, the cache server feeds back the webpage update data to the terminal according to the first update request, so that the terminal updates the current webpage data according to the webpage update data.

After the cache server receives the update identifier, the cache server searches the webpage update data corresponding to the update identifier in the pre-cached webpage data, and feeds back the webpage update data to the terminal.

Step 105, the terminal receives the webpage update data fed back by the cache server according to the first update request.

Step 106, the terminal updates the current webpage data according to the webpage update data.

The terminal updates the current webpage data in the terminal after receiving the webpage update data. For example, the current page in the application program is updated, or the display elements in the current page in the application program are updated which are not limited in the embodiments.

In summary, the method for updating webpage data provided by the embodiment, through obtaining an update identifier corresponding to latest released webpage update data; sending a first update request for obtaining the webpage update data to the cache server, the first update request carries the update identifier; and receiving the webpage update data fed back by the cache server according to the first update request, solves the problem that when the identifier of the webpage update data is the same as that of the current webpage data, the cache server sends the current webpage data as the webpage update data to the terminal again causing waste of the broadband resource, and achieves an effect of saving the bandwidth resource.

Second Embodiment

Figure 2:
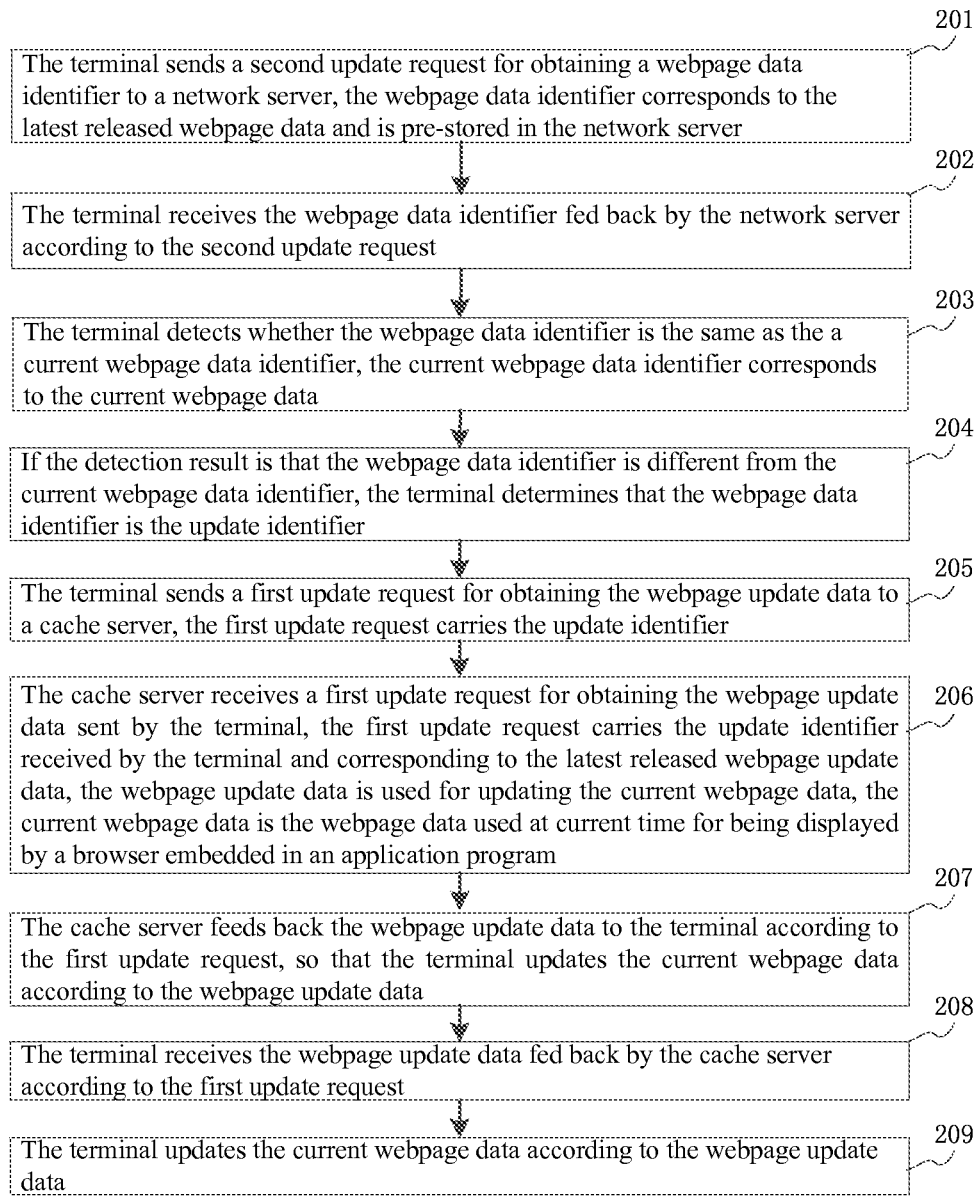
FIG. 2 is a method flowchart of a method for updating webpage data provided by a second embodiment.

Referring to FIG. 2, it shows a method flowchart of a method for updating webpage data provided by a second embodiment, wherein the method for updating webpage data can be applied to a system comprising a terminal and a cache server, the terminal can be an smart TV, smart phone or tablet computer etc., the cache server can be a CDN or a cache device etc. The method for updating webpage data comprise:

Step 201, the terminal sends a second update request for obtaining a webpage data identifier to a network server, the webpage data identifier corresponds to the latest released webpage data and is pre-stored in the network server;

wherein the webpage data is webpage data displayed by a browser embedded in the application program, and can be obtained from the cache server. Therefore, for the purpose of distinction, the webpage data may be classified into the webpage update data and the current webpage data, the webpage update data is used for updating the current webpage data, and the current webpage data is the webpage data is used for being displayed by the browser embedded in the application program at current time.

In this embodiment, the terminal can send to the network server a second update request which is used for obtaining the webpage data identifier corresponding to the latest released webpage data, so as to determine whether there exists webpage update data according to the feedback from the network server. Because the traffic consumed by the terminal sending the second update request is very low, there is no extra waste of broadband resource.

Particularly, the terminal can send the second update request to the network server after receiving an update signal from the user; or the terminal can send the second update request to the network server at scheduled time, which is not limited in the embodiments. Wherein when the terminal sends the second update request to the network server at scheduled time, the pre-set interval can be set, for example, the second update request is sent to the network server every two hours, or the second update request is sent to the network server every half of an hour, etc.; or, the sending time can also be set, for example, the second update request is sent to the network server at 7 o'clock, or the second update request is sent to the network server at 10 o'clock, etc.

Step 202, the terminal receives the webpage data identifier fed back by the network server according to the second update request.

In this embodiment, different identifiers can be set for the webpage data released every time, so as to distinguish the webpage update data from the current webpage data. CDN networks do not notify the terminal that there exists the webpage update data after the data server has released the webpage data into the CDN networks, therefore, in order for the terminal to update data in time, after the data server has released the webpage data into the CDN networks, a configuration file which includes the webpage data identifier corresponding to the released webpage data may be sent to the network server, so that the terminal can determine if the webpage update data exists according to the webpage data identifier in the network server.

Particularly, after the network server receives the second update request, the webpage data identifier corresponding to the latest released webpage data in the configuration file is read, and the webpage data identifier is sent to the terminal. The terminal receives the webpage data identifier sent by the network server, and detects whether the webpage update data exists according to the webpage data identifier.

Step 203, the terminal detects whether the webpage data identifier is the same as a current webpage data identifier, the current webpage data identifier corresponds to the current webpage data, and executes the step 204 if the detection result is that the webpage data identifier is different from the current webpage data identifier.

The network server sends to the terminal only the webpage data identifier corresponding to the latest released webpage data, but not determine whether the latest released webpage data is the webpage update data, therefore it also needs to determine whether the webpage data identifier is the update identifier corresponding to the webpage update data after the terminal receives the webpage data identifier.

Particularly, after the terminal receives the webpage data identifier corresponding to the latest released webpage data, it can obtain the current webpage data identifier corresponding to the current webpage data, and compare the received webpage data identifier with the current webpage data identifier. If the webpage data identifier is the same as the current webpage data identifier, then it indicates that the latest released webpage data is the current webpage data and no webpage update data exists at current time, and the process ends; if the webpage data identifier is different from the current webpage data identifier, then it indicates that the latest released webpage data is different from the current webpage data and there exists webpage update data at current time, and the terminal executes step 204.

Step 204, the terminal determines that the webpage data identifier is the update identifier.

Particularly, if the webpage data identifier is a version number of the webpage data, then the update identifier can be an update version number of the webpage data, and the current webpage data identifier can be the current version number of the current webpage data identifier. Of course, the webpage data identifier can also be other identifiers, which are not limited in the embodiments.

Step 205, the terminal sends a first update request for obtaining the webpage update data to a cache server, the first update request carries the update identifier.

After the terminal determines that the received webpage data identifier is the update identifier, it determines that the webpage update data exists at current time, then the first update request can be sent to a cache server which has pre-cached the webpage update data. In order for the cache server to confirm the webpage update data requested by the terminal, an update identifier corresponding to the webpage update data may be carried in the first update request, so that the cache server feeds back the webpage update data to the terminal according to the update identifier.

Furthermore, if the cache server is one CDN in the CDN networks, then the terminal directly sends the first update request to the CDN; if the cache server is a cache device, then the terminal still sends the first update request to one CDN in the CDN networks, and the cache device intercepts the first update request, and processes the intercepted first update request.

Step 206, the cache server receives a first update request for obtaining the webpage update data sent by the terminal, the first update request carries the update identifier received by the terminal and corresponding to the latest released webpage update data, the webpage update data is used for updating the current webpage data, the current webpage data is the webpage data used at current time for being displayed by a browser embedded in an application program.

In the present embodiment, if the cache server is one CDN in the CDN networks, then the CDN can receive the first update request sent by the terminal, and feed back the webpage update data to the terminal according to the update identifier carried in the first update request; if the cache server is a cache device, then the cache device intercepts the first update request sent to one CDN in the CDN networks by the terminal, and uses the intercepted first update request as the received first update request.

If the cache server is a cache device, in order to save bandwidth, the cache device may be set with an update policy, for example, requesting CDN for webpage update data at every pre-determined interval and pre-caching the webpage update data, and if the CDN receives the webpage update data at the pre-determined interval, then the cache device requests the CDN for the webpage update data until the timing reaches the pre-determined interval, so that the cache device cannot obtain timely the webpage update data stored in the CDN.

Furthermore, if the terminal requests the CDN for the webpage update data at a pre-determined interval, because the timing of the cache device does not reach the pre-determined interval, what stored in the cache device is still the current webpage data and the identifier of the existing webpage update data is the same as that of the current webpage data, then the cache device will send the current webpage data to the terminal, instead of requesting the CDN for the webpage update data, so that the terminal cannot obtain timely the webpage update data, reducing the efficiency for updating the webpage data.

In this embodiment, because the update identifier corresponding to the webpage update data is different from the current webpage data identifier corresponding to the current webpage data, after the terminal sends the first update request to the CDN, the cache device will detect whether the webpage update data corresponding to the update identifier exists in itself according to the update identifier; if the cache device detects that the webpage update data corresponding to the update identifier does not exist in itself, then the cache device requests the CDN for the webpage update data, so as to avoid the problem that the current webpage data is sent to the terminal again causing waste of the broadband resource.

Step 207, the cache server feeds back the webpage update data to the terminal according to the first update request, so that the terminal updates the current webpage data according to the webpage update data.

Particularly, if the cache server is a cache device located between the CDN and the terminal, then the step of feeding back the webpage update data to the terminal according to the first update request may comprise: detecting whether the webpage update data corresponding to the update identifier exists; if the detection result is that the webpage update data corresponding to the update identifier exists, feeding back the webpage update data to the terminal; if the detection result is that the webpage update data corresponding to the update identifier doesn't exist, requesting CDN for the webpage update data according to the update identifier; receiving the webpage update data fed back by the CDN according to update identifier; feeding back the webpage update data to the terminal.

In this embodiment, if the cache server is one CDN in the CDN networks, then the CDN sends the webpage update data corresponding to the update identifier to the terminal; if the cache server is a cache device, and the cache device detects according to the update identifier that the webpage update data e corresponding to the update identifier does not exist in itself, then the cache device requests one CDN in the CDN networks for the webpage update data according to the update identifier, so that the CDN feeds back the webpage update data corresponding to the update identifier to the cache device according to the update identifier, so that the terminal can obtain the webpage update data, increasing the efficiency for updating the webpage data; if the cache device detects that the webpage update data corresponding to the update identifier exists in itself, then the cache device feeds back the webpage update data to the terminal.

Step 208, the terminal receives the webpage update data fed back by the cache server according to the first update request.

Particularly, if the cache server is a cache device located between the CDN and the terminal, then the step of receiving the webpage update data fed back by the cache server according to the first update request may comprise:

if the webpage update data corresponding to the update identifier exists in the cache device, receiving the webpage update data fed back by the cache device according to the update identifier;

if the webpage update data corresponding to the update identifier does not exist in the cache device, receiving the webpage update data received and fed back by the cache device after requesting the CDN according to the update identifier;

wherein by requesting the webpage update data according the update identifier, the terminal can obtain timely the webpage update data, increasing the efficiency of updating the webpage data.

It is additionally noted that if there is no CDN network in the networks, the webpage data may be released to a network server, so that the terminal sends the first update request for obtaining the webpage update data to the network server, the first update request carries an update identifier; the network server receives the first update request for obtaining the webpage update data sent by the terminal; the network server feeds back the webpage update data to the terminal according to the update identifier; the terminal receives the webpage update data fed back by the network server according to the first update request. Particularly, the process of requesting the network server for webpage update data by the terminal is illustrated in detail in the description of the steps 205 to 208, which will not be iterated herein.

Step 209, the terminal updates the current webpage data according to the webpage update data.

The terminal updates the current webpage data in the terminal after receiving the webpage update data. For example, the current page in the application program is updated, or the display elements in the current page of the application program are updated, which are not limited in the embodiments.

It is additionally noted that, after the current webpage data is updated according to the webpage update data, it may further comprise:

collecting feedback information of the webpage update data;

detecting whether the feedback information meets a pre-set condition;

if the detection result is that the feedback information meets the pre-set condition, obtaining historical webpage data released before the webpage update data, and recovering the webpage update data according to the historical webpage data;

wherein the pre-set condition includes at least one of the condition that the number of the feedback information is beyond a first threshold and the condition that an average rating included in the feedback information is less than a second threshold.

Furthermore, a data server can track the use of the webpage update data, that is, it can collect the feedback information of the webpage update data fed back by a user, the feedback information may be error information for notifying errors of the webpage update data, or the feedback information may include ratings and/or evaluations for the webpage update data by the user, which are not limited in the embodiments.

The data server can display the feedback information to developers after collecting the feedback information, in order for the developers to recover the webpage update data, therefore increasing the accuracy of the webpage data; or a pre-set condition can be setup for detecting whether the feedback information meets the pre-set condition; if the feedback information meets the pre-set condition, then the webpage update data is recovered automatically, increasing the accuracy of the webpage data; if the feedback information does not meet the pre-set condition, then the webpage update data is not recovered, wherein the pre-set condition may include at least one of the condition that the number of feedback information is beyond a first threshold and the condition that an average rating included in the feedback information is less than a second threshold.

Particularly, the historical webpage data released before the webpage update data may be determined, the historical webpage data identifier corresponding to the determined historical webpage data is used as the webpage data identifier corresponding to the latest released webpage data, and the historical webpage data identifier is fed back to the terminal, so that the terminal requests the cache server according to the historical webpage data identifier for the historical webpage data corresponding to the historical webpage data identifier, and the historical webpage data is used to recover the webpage update data. For example, the historical webpage data may be the webpage data released before the webpage update data.

In summary, the method for updating webpage data provided by the embodiment, through obtaining an update identifier corresponding to the latest released webpage update data; sending a first update request for obtaining the webpage update data to the cache server, the first update request carries the update identifier; and receiving the webpage update data fed back by the cache server according to the first update request, solves the problem that the cache server sends the current webpage data as the webpage update data to the terminal again causing waste of the broadband resource and achieves an effect of saving the bandwidth resource. Additionally, through receiving the webpage update data fed back by the cache device according to the update identifier; or receiving the webpage update data received and fed back by the cache device after requesting the CDN according to the update identifier, at least one embodiment resolves the problem that when there is no webpage update data in the cache device, the cache device sends the current webpage data to the terminal again instead of requesting the CDN for the webpage update data, causing that the terminal is unable to update the webpage update data in time, and achieves an effect of increasing the efficiency for update the webpage update data.

Third Embodiment

Figure 3:
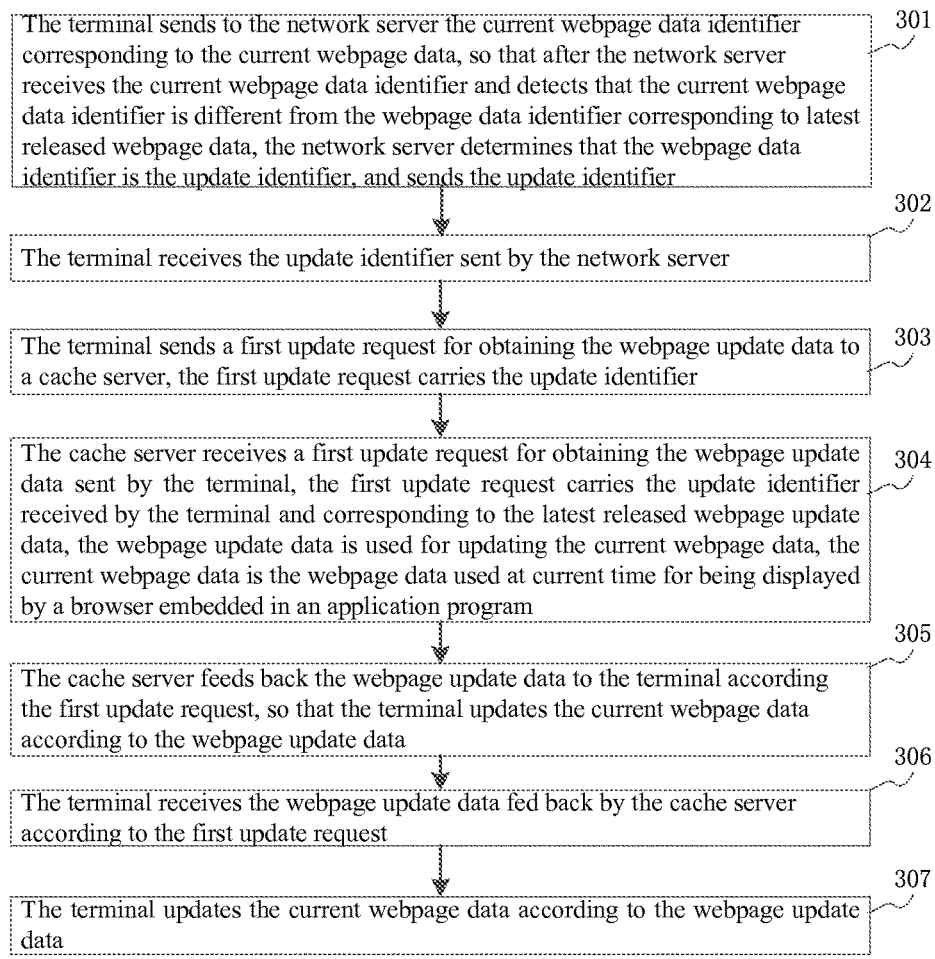
FIG. 3 is a method flowchart of a method for updating webpage data provided by a third embodiment.

Referring to FIG. 3, it shows a method flowchart of a method for updating webpage data provided by a third embodiment, wherein the method for updating webpage data can be applied to a system comprising a terminal and a cache device, which terminal can be a smart TV, smart phone or tablet computer, etc., the cache server can be a CDN or a cache device, etc. The method for updating webpage data comprises:

Step 301, the terminal sends to the network server the current webpage data identifier corresponding to the current webpage data, so that after the network server receives the current webpage data identifier and detects that the current webpage data identifier is different from the webpage data identifier corresponding to latest released webpage data, the network server determines that the webpage data identifier is the update identifier, and sends the update identifier;

wherein the webpage data is webpage data displayed by a browser embedded in the application program, and can be obtained from the cache server. Because the webpage data may be updated, therefore, for the purpose of distinction, the webpage data may be classified into the webpage update data and the current webpage data, the webpage update data is used for updating the current webpage data, and the current webpage data is the webpage data used for being displayed by the browser embedded in the application program at current time.

In this embodiment, different identifiers can be set for the webpage data released every time, so as to distinguish the webpage update data from the current webpage data. After the data server releases the webpage data to the CDN networks, CDN networks do not notify the terminal that there exists the webpage update data, therefore, in order for the terminal to update data in time, after the data server has released the webpage data into the CDN networks, a configuration file which includes the webpage data identifier corresponding to the released webpage data may be sent to the network server, so that the terminal can determine if the webpage update data exists according to the webpage data identifier in the network server.

Particularly, the terminal sends the current webpage data identifier corresponding to the current webpage data to the network server, after receiving the current webpage data identifier, the network server determines the webpage data identifier corresponding to the latest released webpage data, detects whether the webpage data identifier is the same as the received current webpage data identifier, if the detection result is that the webpage data identifier is the same as the received current webpage data identifier determines that there is no webpage update data; if the detection result is that the webpage data identifier is different from the current webpage data identifier, determines that the webpage data identifier is the update identifier and sends the update identifier to the terminal. Wherein, the update identifier may be an update version number of the webpage update data, the current webpage data identifier may be a current version number of the current webpage data.

In some embodiments, the webpage data identifier may be encrypted, for example, by using MD5 (Message Digest Algorithm 5), wherein a MD5 value of the current webpage data identifier is calculated, and the MD5 value is sent to the network server, the network server detects whether the MD5 value is the same as the MD5 value calculated according to the latest released webpage data identifier; if they are same, then it indicates that the webpage data identifier is the same as the current webpage data identifier, there is no webpage update data at current time, the network server feeds back an answering message of no webpage update data to the terminal, and the process ends; if they are different, then it indicates that the webpage data identifier is different from the current webpage data identifier, there exists webpage update data at current time, the network server determines that webpage data identifier corresponding to the latest released webpage data is the update identifier, and sends the update identifier to the terminal, in order for the terminal to obtain the webpage update data according to the update identifier.

Furthermore, after receiving a update signal sent by user the terminal can send the current webpage data identifier to the network server; or the terminal can send the current webpage data identifier to the network server at scheduled time, the process of which can be seen in the description of step 201, and will not be iterated herein.

Step 302, the terminal receives the update identifier sent by the network server;
wherein if there is no webpage update data the terminal receives the answering message sent by the network server; and if there is webpage update data the terminal receives the update identifier sent by the network server, and requests the cache server according to the update identifier for the webpage update data corresponding to the update identifier.

Step 303, the terminal sends a first update request for obtaining the webpage update data to a cache server, the first update request carries the update identifier.

Particularly, if the cache server is one CDN in the CDN networks, then the terminal directly sends the first update request to the CDN, if the cache server is a cache device, then the terminal still sends the first update request to one CDN in the CDN networks, and the cache device intercepts the first update request, and processes the intercepted first update request.

Step 304, the cache server receives a first update request for obtaining the webpage update data sent by the terminal, the first update request carries the update identifier received by the terminal and corresponding to the latest released webpage update data, the webpage update data is used for updating the current webpage data, the current webpage data is the webpage data used at current time for being displayed by a browser embedded in an application program.

In the present embodiment, if the cache server is one CDN in the CDN networks, then the CDN can receive the first update request sent by the terminal, and feed back the webpage update data to the terminal according to the update identifier carried in the first update request; if the cache server is a cache device, then the cache device intercepts the first update request sent to one CDN in the CDN networks by the terminal, and uses the intercepted first update request as the received first update request.

Because the update identifier corresponding to the webpage update data is different from the current webpage data identifier corresponding to the current webpage data, after the terminal sends the first update request to the CDN, the cache device detects whether the webpage update data corresponding to the update identifier exists in itself according the update identifier; if the cache device detects that the webpage update data corresponding to the update identifier does not exist in itself, then the cache device requests the CDN for the webpage update data, so as to avoid the problem that the current webpage data is sent to the terminal again causing waste of the broadband resource.

Step 305, the cache server feeds back the webpage update data to the terminal according the first update request, so that the terminal updates the current webpage data according to the webpage update data.

Particularly, if the cache server is a cache device located between the CDN and the terminal, then the stop of feeding back the webpage update data to the terminal according the first update request may comprise:
  detecting whether the webpage update data corresponding to the update identifier exists;
  if the detection result is that the webpage update data corresponding to the update identifier exists, feeding back the webpage update data to the terminal;
  if the detection result is that the webpage update data corresponding to the update identifier does not exist, requesting CDN for the webpage update data according the update identifier; receiving the webpage update data fed back by the CDN according to the update identifier; feeding back the webpage update data to the terminal.

Particularly, the process of feeding back the webpage update data by the cache server is illustrated in detail in the description of step 207, which will not be iterated herein.

Step 306, the terminal receives the webpage update data fed back by the cache server according to the first update request.

Particularly, if the cache server is a cache device located between the CDN and the terminal, then the step of receiving the webpage update data fed back by the cache server according to the first update request may comprise:
  if the webpage update data corresponding to the update identifier exists in the cache device, receiving the webpage update data fed back by the cache device according to the update identifier;
  if the webpage update data corresponding to the update identifier does not exist in the cache device, receiving the webpage update data received and fed back by the cache device after requesting the CDN according to the update identifier;
  wherein by requesting the webpage update data according the update identifier, the terminal can obtain timely the webpage update data, increasing the efficiency of for updating the webpage data.

It is additionally noted that if there is no CDN network in the networks, the webpage data may be released to a network server, so that the terminal sends the first update request for obtaining the webpage update data to the network server, the first update request carries an update identifier; the network server receives the first update request for obtaining the webpage update data sent by the terminal; the network server feeds back the webpage update data to the terminal according to the update identifier; the terminal receives the webpage update data fed back by the network server according to the first update request. Particularly, the process of requesting the network server for the webpage update data by the network server is illustrated in detail in the description of the steps 301 to 302, which will not be iterated herein.

Step 307, the terminal updates the current webpage data according to the webpage update data.

The terminal updates the current webpage data in the terminal after receiving the webpage update data. For example, the current page in the application program is updated, or the display elements in the current page of the application program are updated, which are not limited in the embodiments.

It is additionally noted that, after the current webpage data is updated according to the webpage update data, it may further comprise:
  collecting the feedback information of the webpage update data;
  detecting whether the feedback information meets a pre-set condition;
  if the detection result is that the feedback information meets the pre-set condition, obtaining historical webpage data released before the webpage update data, and recovering the webpage update data according to the historical webpage data;
  wherein the pre-set condition includes at least one of the condition that the number of the feedback information is beyond a first threshold and the condition that an average rating included in the feedback information is less than a second threshold.

Particularly, the process of recovering the webpage update data is illustrated in detail in the description of step 209, which is not iterated herein.

In summary, the method for updating webpage data provided by the embodiment, through obtaining an update identifier corresponding to the latest released webpage update data; sending a first update request for obtaining the webpage update data to the cache server, the first update request carries the update identifier; and receiving the webpage update data fed back by the cache server according to the first update request, solves the problem that the cache server sends the current webpage data as the webpage update data to the terminal again causing waste of the broadband resource and achieves an effect of saving the bandwidth resource. Additionally, through receiving the webpage update data fed back by the cache device according to the update identifier; or receiving the webpage update data received and fed back by the cache device after requesting the CDN according to the update identifier, at least one embodiment resolves the problem that when there is no webpage update data in the cache device, the cache device sends the current webpage data to the terminal again instead of requesting the CDN for the webpage update data, causing that the terminal is unable to update the webpage update data in time, and achieves an effect of increasing the efficiency for updating the webpage update data.

Fourth Embodiment

Figure 4:
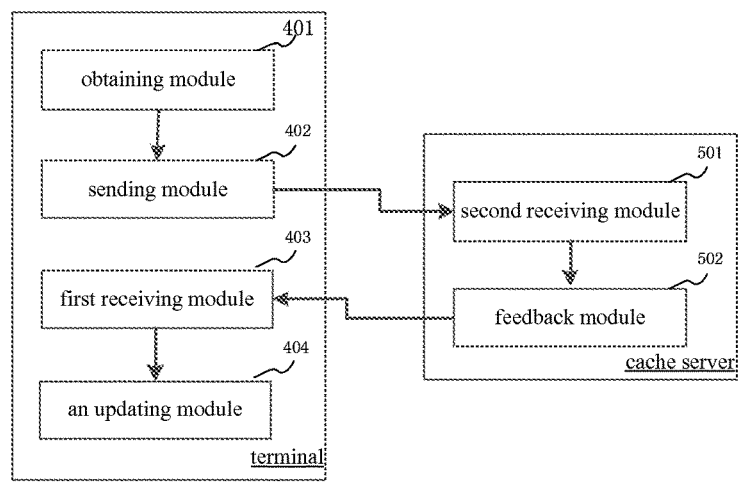
FIG. 4 is a structural schematic view of a system for updating webpage data provided by a fourth embodiment.

Referring to FIG. 4, it shows a structural view of a system for updating webpage data provided by the fourth embodiment, the system for updating webpage data may include a terminal and a cache server. The terminal may be a smart TV, smart phone or tablet computer, etc., which can include at least a processor (not shown) operating in conjunction with a memory (not shown) and a plurality of modules, the plurality of modules comprising a obtaining module 401, a sending module 402, a first receiving module 403 and an updating module 404; the cache server may be a CDN or a cache device, which can include at least a processor (not shown) operating in conjunction with a memory (not shown) and a plurality of modules, the plurality of modules comprising a second receiving module 501 and a feedback module 502.

The obtaining module 401 is used for obtaining an update identifier corresponding to latest released webpage update data, the webpage update data is used to update the current webpage data, the current webpage data is webpage data for being displayed by a browser embedded in an application program at current time.

The sending module 402 is used for sending a first update request for obtaining the webpage update data to a cache server, the first update request carries the update identifier obtained by the obtaining module 401.

The second receiving module 501 is used for receiving a first update request for obtaining the webpage update data sent by the terminal, the first update request carries the update identifier received by the terminal and corresponding to the latest released webpage update data, the webpage update data is used for updating the current webpage data, the current webpage data is the webpage data used at current time for being displayed by a browser embedded in an application program.

The feedback module 502 is used for feeding back the webpage update data to the terminal according to the first update request received by the second receiving module 501, so that the terminal updates the current webpage data according to the webpage update data.

The first receiving module 403 is used for receiving the webpage update data fed back by the cache server according to the first update request sent by the sending module.

The updating module 404 is used for updating the current webpage data according to the webpage update data received by the first receiving module 403.

In summary, the system for updating webpage data provided by the embodiment, through obtaining an update identifier corresponding to the latest released webpage update data; sending a first update request for obtaining the webpage update data to the cache server, the first update request carries the update identifier; and receiving the webpage update data fed back by the cache server according to the first update request, solves the problem that when the identifier of the webpage update data is the same as that of the current webpage data, the cache server sends the current webpage data as the webpage update data to the terminal again causing waste of the broadband resource, and achieves an effect of saving the bandwidth resource.

Fifth Embodiment

Figure 5:
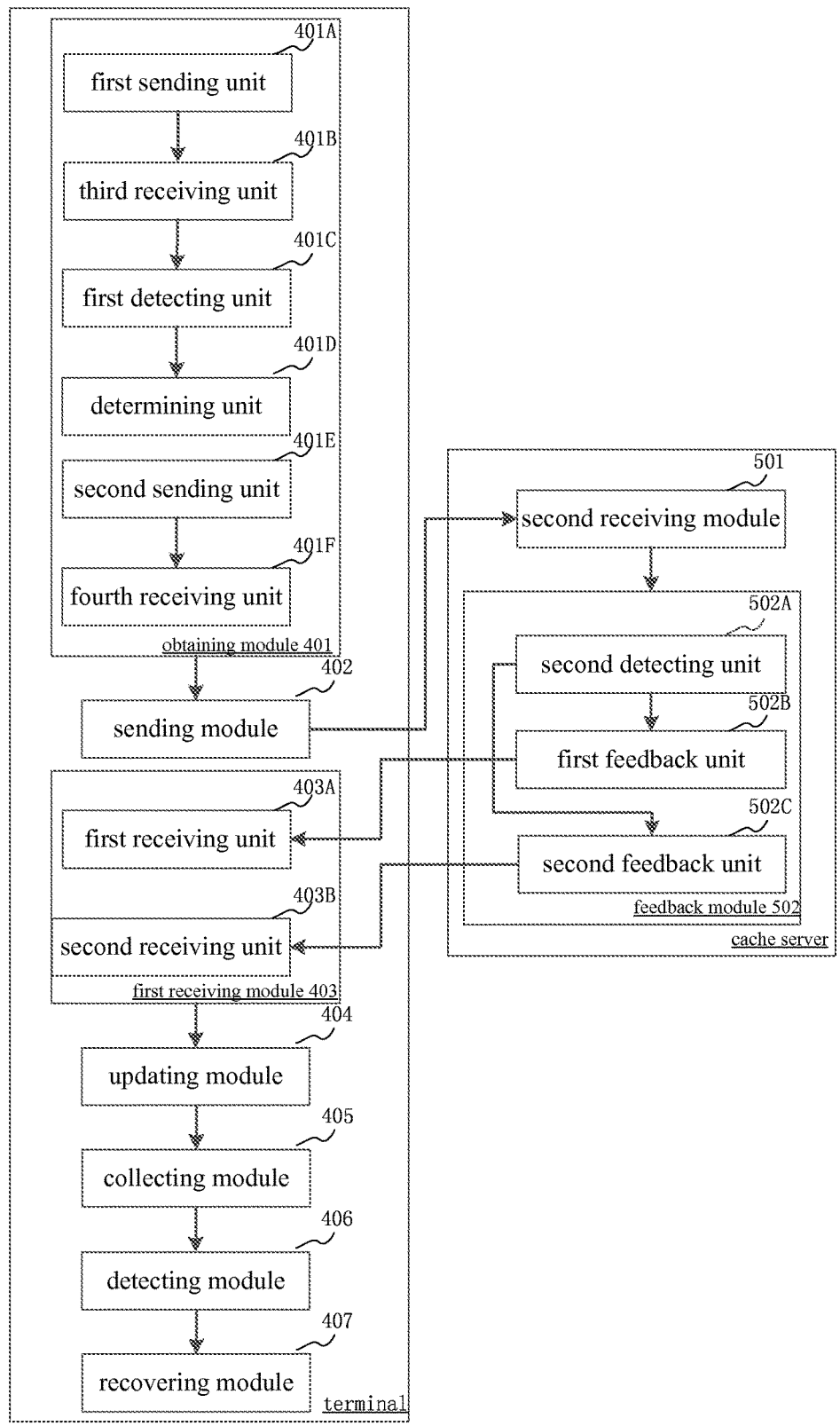
FIG. 5 is a structural schematic view of a system for updating webpage data provided by a fifth embodiment.

Referring to FIG. 5, it shows a structural view of a system for updating webpage data provided by the fifth embodiment, the system for updating webpage data may include a terminal and a cache server. The terminal may be a smart TV, smart phone or tablet computer etc., which can include at least a processor (not shown) operating in conjunction with a memory (not shown) and a plurality of modules, the plurality of modules comprising an obtaining module 401, a sending module 402, a first receiving module 403 and an updating module 404; the cache server may be a CDN or a cache device etc., which can include at least a processor (not shown) operating in conjunction with a memory (not shown) and a plurality of modules, the plurality of modules comprising a second receiving module 501 and a feedback module 502.

The obtaining module 401 is used for obtaining an update identifier corresponding to the latest released webpage update data, the webpage update data is used to update the current webpage data, the current webpage data is webpage data for being displayed by a browser embedded in an application program at current time.

The sending module 402 is used for sending a first update request for obtaining the webpage update data to a cache server, the first update request carries the update identifier obtained by the obtaining module 401.

The second receiving module 501 is used for receiving a first update request for obtaining the webpage update data sent by the terminal, the first update request carries the update identifier received by the terminal and corresponding to the latest released webpage update data, the webpage update data is used for updating the current webpage data, the current webpage data is the webpage data that is used at current time for being displayed by a browser embedded in an application program.

The feedback module 502 is used for feeding back the webpage update data to the terminal according to the first update request received by the second receiving module 501, so that the terminal updates the current webpage data according to the webpage update data.

The first receiving module 403 is used for receiving the webpage update data fed back by the cache server according to the first update request sent by the sending module.

The updating module 404 is used for updating the current webpage data according to the webpage update data received by the first receiving module 403.

Furthermore, if the cache server is a cache device located between the CDN and the terminal, then the feedback module 502 may comprise:
 a second detecting unit 502A for detecting whether the webpage update data corresponding to the update identifier exists;
 a first feedback unit 502B for, if the detection result of the second feedback unit 502A according to the update identifier is that the webpage update data corresponding to the update identifier exists, feeding back the webpage update data to the terminal;
 a second feedback unit 502C for, if the detection result of the second detecting unit 502A according to the update identifier is that the webpage update data corresponding to the update identifier does not exist, requesting the CDN for the webpage update data according to the update identifier; receiving the webpage update data fed back by the CDN according to the update identifier; and feeding back the webpage update data to the terminal.

The first receiving module 403 may comprise:
a first receiving unit 403A for, if the webpage update data corresponding to the update identifier exists in the cache device, receiving the webpage update data fed back by the cache device according to the update identifier;
a second receiving unit 403B for, if the webpage update data corresponding to the update identifier does not exist in the cache device, receiving the webpage update data received and fed back by the cache device after requesting the CDN according to the update identifier.

Furthermore, the obtaining module 401 may comprise:
a first sending unit 401A for sending a second update request for obtaining a webpage data identifier to a network server, the webpage data identifier corresponds to the latest released webpage data and is pre-stored in the network server;
 a third receiving unit 401B for receiving the webpage data identifier fed back by the network server according to the second update request sent by the first sending unit 401A;
 a first detecting unit 401C for detecting whether the webpage data identifier received by the third receiving unit 401B is the same as the current webpage data identifier, the current webpage data identifier corresponds to the current webpage data;
 a determining unit 401D for, if the detection result of the first detecting unit 401C is that the webpage data identifier is different from the current webpage data identifier, determining that the webpage data identifier is the update identifier.

Furthermore, the obtaining module 401 may comprise:
a second sending unit 401E for sending the current webpage data identifier corresponding to the current webpage data to the network server, so that the network server determines that the webpage data identifier is the update identifier, and feeds back the update identifier after the network server receives the current webpage data identifier and detects that the current webpage data identifier is different from the webpage data identifier corresponding to the latest released webpage data;
 a fourth receiving unit 401F for receiving the update identifier fed back by the network server according to the current webpage data identifier sent by the second sending unit 401E.

Furthermore, the terminal may comprise:
a collecting module 405 for collecting feedback information of the webpage update data after the update module 405 updates the current webpage data according to the webpage update data;
a detecting module 406 for detecting whether the feedback information collected by the collecting module 405 meets a pre-set condition;
a recovering module 407 for, if the detection result of the detecting module 406 is that the feedback information meets the pre-set condition, obtaining historical webpage data released before the webpage update data, and recovering the webpage update data according to the historical webpage data;
wherein the pre-set condition includes at least one of the condition that the number of the feedback information is beyond a first threshold and the condition that an average rating included in the feedback information is less than a second threshold.

Furthermore, the update identifier may be an update version number of the webpage update data, the current webpage data identifier may be a current version number of the current webpage data.

In summary, the system for updating webpage data provided by the embodiment, through obtaining an update identifier corresponding to the latest released webpage update data; sending a first update request for obtaining the webpage update data to the cache server, the first update request carries the update identifier; and receiving the webpage update data fed back by the cache server according to the first update request, solves the problem that when the identifier of the webpage update data is the same as that of the current webpage data, the cache server sends the current webpage data as the webpage update data to the terminal again causing waste of the broadband resource, and achieves an effect of saving the bandwidth resource. Additionally, through receiving the webpage update data fed back by the cache device according to the update identifier; or receiving the webpage update data received and fed back by the cache device after requesting the CDN according to the update identifier, at least one embodiment resolves the problem that when there is no webpage update data in the cache device, the cache device sends the current webpage data to the terminal again instead of requesting the CDN for the webpage update data, causing that the terminal is unable to update the webpage update data in time and achieves an effect of increasing the efficiency for updating the webpage data.

Sixth Embodiment

Figure 6:
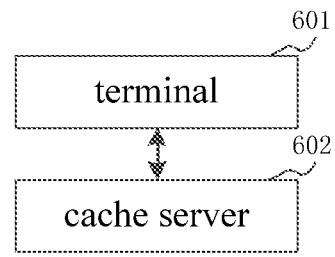
FIG. 6 is a structural schematic view of a system for updating webpage data provided by a sixth embodiment.

Referring to FIG. 6, it shows a structural view of a system for updating webpage data provided by the sixth embodiment. The system for updating webpage data comprise: a terminal 601 and a cache server 602. The terminal may be a smart TV, a smart phone, or a tablet computer, etc. and the cache server may be a CDN or a cache device, etc.

The terminal 601 may be a terminal provided by the third embodiment, and the cache server 602 may be a cache server provided by the third embodiment; or the terminal 601 may be a terminal provided by the fourth embodiment, and the cache server 602 may be a cache server provided by the fourth embodiment.

Figure 7:
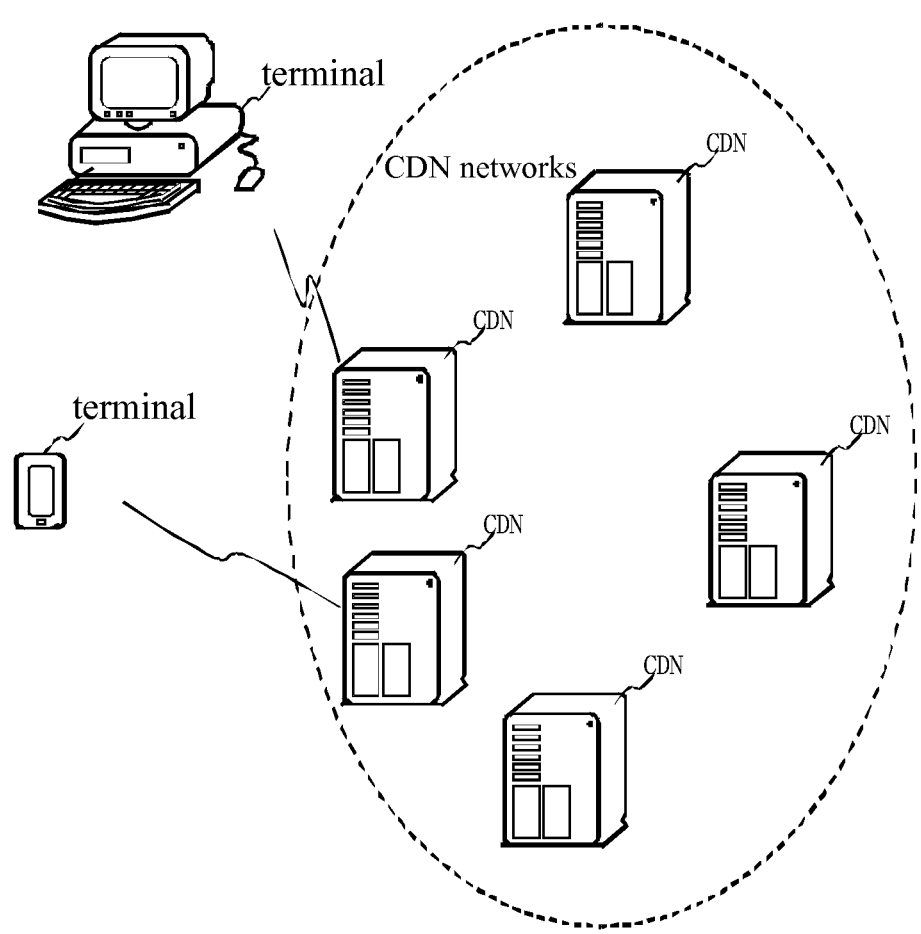
FIG. 7 is a first schematic view of a system for updating webpage data provided by a sixth embodiment.
Figure 8:
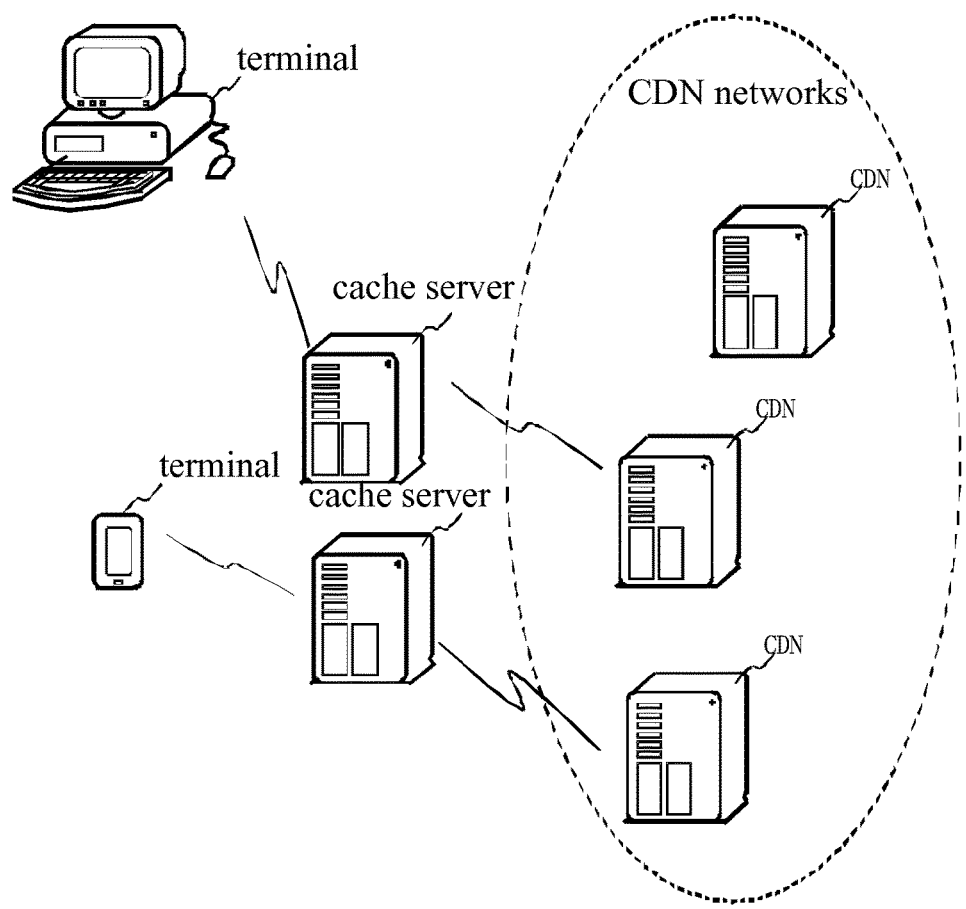
FIG. 8 is a second schematic view of a system for updating webpage data provided by a sixth embodiment.

Referring to FIG. 7, it shows a first schematic view of the system for updating webpage, the cache server in the figure is a CDN in the CDN networks; or Referring to FIG. 8, it shows a second schematic view of the system for updating webpage, the cache server in the figure is a cache device which is located between the CDN and the terminal.

In summary, the system for updating webpage data provided by the embodiment, through obtaining an update identifier corresponding to the latest released webpage update data; sending a first update request for obtaining the webpage update data to the cache server, the first update request carries the update identifier; and receiving the webpage update data fed back by the cache server according to the first update request, solves the problem that when the identifier of the webpage update data is the same as that of the current webpage data, the cache server sends the current webpage data as the webpage update data to the terminal again causing waste of the broadband resource, and achieves an effect of saving the bandwidth resource. Additionally, through receiving the webpage update data fed back by the cache device according to the update identifier; or receiving the webpage update data received and fed back by the cache device after requesting the CDN according to the update identifier, at least one embodiment resolves the problem that when there is no webpage update data in the cache device, the cache device sends the current webpage data to the terminal again instead of requesting the CDN for the webpage update data, causing that the terminal is unable to update the webpage update data in time, and achieves an effect of increasing the efficiency for updating the webpage data.

It should be noted that the terminal, when the cache server and the system for updating webpage data provided by above embodiments update the webpage data, the division of each above function module is only for exemplary illustration; in practice, the above functions may be to be implemented by different function modules as required, that is, the internal structures of the terminal, the cache server and the system for updating webpage data can be divided into different function modules, so as to accomplish the full or partial functions described above. Additionally, the terminal, the cache server and the system for updating webpage data provided by the above embodiments belongs to the same conception as the method for updating webpage data, the particular implementation process of which can be referred to the embodiments of the method, and will not be iterated herein.

In a further aspect, the described technology also provides a computer program product comprising program codes for performing the methods described above according to the embodiments when the computer program product is executed on one or more computing devices. Optionally, the computer program product can be stored on a computer readable recording medium.

The reference numerals of the above embodiments are merely for illustration, and do not indicate priorities of the embodiments.

It should be understood by a person skilled in the art that all or partial steps of the above embodiments can be accomplished by hardware, and can also be accomplished by instructing related hardware by a program, the program can be stored in a computer readable storage medium that can be read only memory (ROM), magnetic disk or optical disc, etc.

Above are only exemplary embodiments of the present invention, and should not be used to limit the present invention. Any changes, equivalent alternations, or modifications made in the spirit and principal of the present invention should be included in the protection scope of the present invention.

What is claimed is:

1. A method for updating webpage data for using in a terminal, comprising:
    obtaining, by the terminal, an update identifier corresponding to latest released webpage update data from a network server, wherein the webpage update data is used to update current webpage data, and wherein the current webpage data is displayable by a browser embedded in an application program;
    sending a first update request for obtaining the webpage update data to a cache server, wherein the first update request includes the update identifier;
    receiving the webpage update data from the cache server based on the first update request; and
    updating the current webpage data based on the webpage update data;
    wherein:
    the cache server is a network node located between a Content Delivery Network (CDN) and the terminal configured to receive the webpage update data from the CDN, and send the webpage update data to the terminal upon request; and
    the network server is configured to store a webpage data identifier corresponding to the latest released webpage update data when a developer releases the webpage update data to the CDN.

2. The method of claim 1, wherein receiving the webpage update data comprises:
    if the webpage update data corresponding to the update identifier exists in the cache device, receiving the webpage update data from the cache device based on the update identifier; and if the webpage update data corresponding to the update identifier does not exist in the cache device, receiving the webpage update data from the cache device after requesting the CDN based on the update identifier.

3. The method of claim 1, wherein obtaining the update identifier comprises:
sending a second update request for obtaining a webpage data identifier to the network server, wherein the webpage data identifier corresponds to the latest released webpage update data and is pre-stored in the network server;
receiving the webpage data identifier from the network server based on the second update request;
determining whether the webpage data identifier is the same as a current webpage data identifier corresponding to the current webpage data;
if the webpage data identifier is determined to be different from the current webpage data identifier, setting the webpage data identifier as the update identifier; and
if the webpage data identifier is determined to be the same as the current webpage data identifier, determining that the current webpage data is the latest released webpage update data, wherein the terminal does not send the first update request for obtaining the webpage update data to the cache server.

4. The method of claim 1, wherein obtaining the update identifier comprises:
sending a current webpage data identifier corresponding to the current webpage data to the network server, which determines that the webpage data identifier is the update identifier and sends the update identifier after i) receiving the current webpage data identifier and ii) determining that the current webpage data identifier is different from the webpage data identifier corresponding to the latest released webpage data; and
receiving the update identifier from the network server.

5. The method of claim 1, wherein after updating the current webpage data, the method further comprises:
collecting feedback information of the webpage update data provided by users of the application program;
detecting whether the feedback information meets a pre-set condition;
if the feedback information meets the pre-set condition, obtaining historical webpage data released before the webpage update data, and recovering the webpage update data based on the historical webpage data,
wherein the pre-set condition includes at least one of i) the condition that the amount of the feedback information is greater than a first threshold and ii) the condition that an average user rating included in the feedback information is less than a second threshold.

6. The method of claim 3, wherein the update identifier is an update version number of the webpage update data and wherein the current webpage data identifier is a current version number of the current webpage data.

7. A method for updating webpage data for using in a cache server, wherein the method comprises:
receiving a first update request for obtaining webpage update data from a terminal, wherein the first update request includes an update identifier corresponding to latest released webpage update data obtained by the terminal from a network server, wherein the webpage update data is used to update current webpage data, and wherein the current webpage data is displayable by a browser embedded in an application program; and
sending the webpage update data to the terminal based on the first update request;

wherein:
the cache server is a network node located between a Content Delivery Network (CDN) and the terminal configured to receive the webpage update data from the CDN, and send the webpage update data to the terminal upon request; and
the network server is configured to store a webpage data identifier corresponding to the latest released webpage update data when a developer releases the webpage update data to the CDN.

8. The method of claim 7, wherein the sending of the webpage update data to the terminal comprises:
determining whether the webpage update data corresponding to the update identifier exists;
if the webpage update data corresponding to the update identifier exists, sending the webpage update data to the terminal;
if the webpage update data corresponding to the update identifier does not exist, requesting the webpage update data from the CDN based on the update identifier, receiving the webpage update data from the CDN based on the update identifier, and sending the webpage update data to the terminal.

9. A terminal, wherein the terminal comprises at least a processor operating in conjunction with a memory and a plurality of modules, the plurality of modules comprising:
an obtaining module configured to obtain an update identifier corresponding to latest released webpage update data from a network server, wherein the webpage update data is used to update current webpage data, and wherein the current webpage data is displayable by a browser embedded in an application program;
a sending module configured to send a first update request for obtaining the webpage update data to a cache server, wherein the first update request includes the update identifier obtained by the obtaining module;
a first receiving module configured to receive the webpage update data from the cache server based on to the first update request sent by the sending module; and
an updating module configured to update the current webpage data based on the webpage update data received by the first receiving module;
wherein:
the cache server is a network node located between a Content Delivery Network (CDN) and the terminal configured to receive the webpage update data from the CDN, and send the webpage update data to the terminal upon request; and
the network server is configured to store a webpage data identifier corresponding to the latest released webpage update data when a developer releases the webpage update data to the CDN.

10. The terminal according to claim 9, wherein the first receiving module comprises:
a first receiving unit configured to receive the webpage update data from the cache device based on the update identifier if the webpage update data corresponding to the update identifier exists in the cache device; and
a second receiving unit configured to receive the webpage update data from the cache device after the cache device has requested and received the webpage update data from the CDN based on the update identifier.

11. The terminal according to claim 9, wherein the obtaining module comprises:
a first sending configured to send a second update request for obtaining a webpage data identifier to the network server, wherein the webpage data identifier corresponds to the latest released webpage update data and is pre-stored in the network server;

a third receiving unit configured to receive the webpage data identifier from the network server based on the second update request sent by the first sending unit;

a first detecting unit configured to determine whether the webpage data identifier received by the third receiving unit is the same as the current webpage data identifier, wherein the current webpage data identifier corresponds to the current webpage data;

a determining unit configured to set the webpage data identifier as the update identifier if the webpage data identifier is determined to be different from the current webpage data identifier; and if the webpage data identifier is determined to be the same as the current webpage data identifier, determine that the current webpage data is the latest released webpage update data, wherein the terminal does not send the first update request for obtaining the webpage update data to the cache server.

12. The terminal according to claim 9, wherein the obtaining module comprises:

a second sending unit configured to send the current webpage data identifier corresponding to the current webpage data to the network server, which determines that the webpage data identifier is the update identifier and sends the update identifier after i) receiving the current webpage data identifier and ii) determining that the current webpage data identifier is different from the webpage data identifier corresponding to the latest released webpage data;

a fourth receiving unit configured to receive the update identifier from the network server based on the current webpage data identifier sent by the second sending unit.

13. The terminal according to claim 9, wherein the terminal further comprises:

a collecting module configured to collect feedback information of the webpage update data provided by users of the application program after the updating module updates the current webpage data based on the webpage update data;

a detecting module configured to detect whether the feedback information collected by the collecting module meets a pre-set condition;

a recovering module configured to i) obtain historical webpage data which is released before the webpage update data if the detection result of the detecting module is that the feedback information meets the pre-set condition and ii) recover the webpage update data based on the historical webpage data;

wherein the pre-set condition includes at least one of i) the condition that the amount of the feedback information is beyond a first threshold and ii) the condition that an average user rating included in the feedback information is less than a second threshold.

14. The terminal according to claim 11, wherein the update identifier is the update version number of the webpage update data and wherein the current webpage data identifier is a current version number of the current webpage data.

15. A cache server, wherein the cache server comprises at least a processor operating in conjunction with a memory and a plurality of modules, the plurality of modules comprising:

a second receiving module configured to receive a first update request for obtaining webpage update data sent by a terminal, wherein the first update request includes an update identifier obtained by the terminal from a network server and corresponding to latest released webpage update data, wherein the webpage update data is used to update the current webpage data, and wherein the current webpage data is displayable by a browser embedded in an application program; and a feedback module configured to send the webpage update data to the terminal based on the first update request received by the second receiving module;

wherein:

the cache server is a network node located between a Content Delivery Network (CDN) and the terminal configured to receive the webpage update data from the CDN, and send the webpage update data to the terminal upon request; and the network server is configured to store a webpage data identifier corresponding to the latest released webpage update data when a developer releases the webpage update data to the CDN.

16. The cache server according to claim 15, wherein the feedback module comprises:

a second detecting unit configured to determine whether the webpage update data corresponding to the update identifier exists;

a first feedback unit configured to send the webpage update data to the terminal if the webpage update data corresponding to the update identifier exists;

a second feedback unit configured to i) request the webpage update data from the CDN based on the update identifier if the webpage update data corresponding to the update identifier does not exist, ii) receive the webpage update data from the CDN based on the update identifier, and iii) send the webpage update data to the terminal.

17. A system for updating webpage data comprising a terminal and a cache server, wherein the terminal comprises at least a processor operating in conjunction with a memory and a plurality of modules, the plurality of modules comprising:

an obtaining module configured to obtain an update identifier corresponding to latest released webpage update data from a network server, wherein the webpage update data is used to update current webpage data, and wherein the current webpage data is configured to be displayed by a browser embedded in an application program;

a sending module configured to send a first update request for obtaining the webpage update data to a cache server, wherein the first update request includes the update identifier obtained by the obtaining module;

a first receiving module configured to receive the webpage update data from the cache server based on the first update request sent by the sending module; and an updating module configured to update the current webpage data based on the webpage update data received by the first receiving module, and wherein the cache server comprises at least a processor operating in conjunction with a memory and a plurality of modules, the plurality of modules comprising:

a second receiving configured to receive the first update request from the terminal; and a feedback module configured to send the webpage update data to the terminal based on the first update request received by the second receiving module;

wherein:

the cache server is a network node located between a Content Delivery Network (CDN) and the terminal configured to receive the webpage update data from the CDN, and send the webpage update data to the terminal upon request; and the network server is configured to store a webpage data identifier corresponding to the latest released webpage update data when a developer releases the webpage update data to the CDN.

18. A non-transitory computer program product comprising program codes for performing a method for updating webpage data, when the computer program product is executed by a processor on a terminal, the method comprising:

obtaining an update identifier corresponding to latest released webpage update data from a network server, wherein the webpage update data is used to update current webpage data and wherein the current webpage data is displayable by a browser embedded in an application program;

sending a first update request for obtaining the webpage update data to a cache server, wherein the first update request includes the update identifier;

receiving the webpage update data from the cache server based on the first update request; and updating the current webpage data based on the webpage update data;

wherein:

the cache server is a network node located between a Content Delivery Network (CDN) and the terminal configured to receive the webpage update data from the CDN, and send the webpage update data to the terminal upon request; and the network server is configured to store a webpage data identifier corresponding to the latest released webpage update data when a developer releases the webpage update data to the CDN.

19. The method of claim 1, wherein sending the first update request for obtaining the webpage update data to the cache server further comprises:

sending, by the terminal, the first update request to one CDN server in the CDN;

intercepting, by the cache server, the first update request; and processing, by the cache server, the intercepted first update request.

20. The method of claim 8, further comprising:

setting an update policy for the cache server to request the CDN for the webpage update data regularly at a pre-determined interval;

when a current time reaches the pre-determined interval, receiving the webpage update data from the CDN; and when the current time has not reach the pre-determined interval, and when the cache server receives the first update request and determines that the webpage update data corresponding to the update identifier does not exist, receiving the webpage update data from the CDN based on the update identifier.

* * * * *